United States Patent Office 3,660,418
Patented May 2, 1972

3,660,418
CERTAIN 2,3,5,6-TETRAHYDROIMIDAZO[2,1-b] THIAZOLES
Robert E. Manning, Mountain Lakes, N.J., assignor to Sandoz-Wander, Inc., Hanover, N.J.
No Drawing. Continuation-in-part of application Ser. No. 841,186, June 19, 1969, which is a continuation of application Ser. No. 790,853, Jan. 13, 1969. This application Mar. 16, 1970, Ser. No. 20,111
Int. Cl. C07d 99/06
U.S. Cl. 260—306.7      11 Claims

ABSTRACT OF THE DISCLOSURE (2,6-substituted phenyl)thiazoles, e.g., 2-(2,6-dichlorophenyl)-5,6-dihydroimidazo[2,1-b]thiazole, are prepared by treating a substituted phenylaldehyde with a substituted thiourea. The compounds are useful as hypotensives.

---

This application is a continuation-in-part of application Ser. No. 841,186 filed June 19, 1969, now abandoned, which is a continuation of Ser. No. 790,853 filed Jan. 13, 1969, now abandoned.

This invention relates to novel heterocyclic compounds. More specifically it relates to novel (2,6-substituted phenyl)thiazoles, intermediates therefor, acid addition salts thereof, and processes for their preparation.

The novel compounds of the present invention may be represented by the formula:

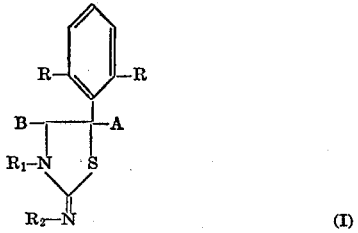

where each R, independently, represents halogen having an atomic weight of about 19–36, trifluoromethyl, or lower alkyl having 1–3 carbon atoms, e.g., methyl, ethyl, propyl, or isopropyl;
each $R_1$ and $R_2$ represent straight chain lower alkyl, i.e., straight chain alkyl having 1–3 carbon atoms such as methyl, ethyl, propyl, or isopropyl; or
$R_1$ and $R_2$ together represent —$(CH_2)_n$— where $n$ represents 2 or 3;
A represents H; and
B represents —OH, or
A and B together represent a carbon to carbon bond.

The process for preparing the compounds of Formula I in acid addition salt form where A and B represent a carbon to carbon bond may be represented as follows:

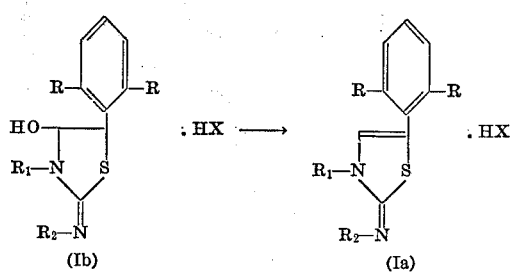

where

R, $R_1$ and $R_2$ have the above stated significance, and X is Br or Cl.

The thiazoles of Formula Ia are prepared from the compounds of Formula Ib by treatment with an acid, e.g., acetic acid at a temperature of from about 50°–120° C., preferably at the reflux temperature of the system. The temperature of reaction is not critical. The reaction may be performed in solvent but use of solvent and the particular solvent utilized is also not considered critical. Solvents which may be used are lower alkanols such as ethanol or isopropanol, and similar inert solvents.

The compounds of Formula Ia may be converted to the free base by conventional methods, such as suspending the salt form in water and adding sodium carbonate.

The compounds Ib may be prepared in accordance with the following reaction scheme:

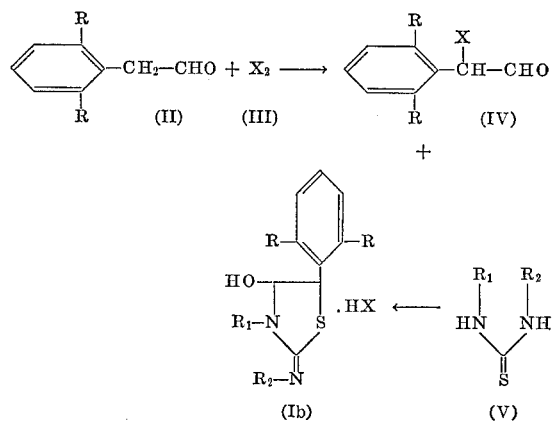

where R, $R_1$, $R_2$ and X have the above-stated significance.

The thiazoles Ib are prepared by halogenating an appropriately substituted acetaldehyde (II) with bromine or a compound which produces bromine, e.g., pyridinium hydrobromide perbromide, or chlorine at a temperature of about minus 25° C. to about minus 10° C., desirably followed by additional heating to reflux temperature. It is understood that the Formula $X_2$ (III) refers to bromine, a bromine producing compound or chlorine. The reaction is performed in inert solvent such as methylene chloride or carbon tetrachloride, an inert co-solvent such as glacial acetic acid may also be used. The resulting haloacetaldehyde (IV) is treated with a compound of Formula V in an inert solvent such as acetone or lower alkanols, e.g., ethanol, at a temperature of about 0°–50° C., preferably about room temperature. Standard techniques may be used to recover the hydroxy thiazoles. Neither the solvents nor reaction temperatures are critical in the above procedures.

When the salts of Formula Ib are recovered and it is desired to convert such salts to the corresponding free bases, conventional methods may be used, e.g., dissolution of the salt in water and precipitation using a base such as sodium hydroxide.

The compounds of Formula I where A represents H and B represents —OH may also be illustrated by their tautomeric equivalents such as represented by the following structural formula

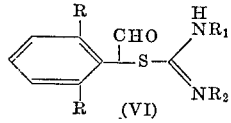

where R, $R_1$ and $R_2$ are as earlier described, and it should be appreciated that these tautomers can exist in equilibrium. In order to simplify this description, however, only Formula I where A is H and —B is OH will be used, although both tautomeric forms are considered to be within the concept of the present invention. It is further recognized that compounds (I) where A is H and B is —OH can exist as geometric and optical isomers and they too are included within the scope of this invention.

Certain of the compounds of Formulas II and V are known and are prepared by methods disclosed in the literature. Those not specifically disclosed are prepared from known materials using analogous methods.

The compounds of Formula I are useful because they possess pharmacological activity in animals. More particularly, the compounds are useful as hypotensives, as indicated by their activity in anesthetized dog given 1–10 micrograms/kg. i.v. of active compound and tested by blood pressure measurement using a mercury manometer or transducer via a catheter inserted in the carotid or femoral artery. When so utilized, the compounds may be combined with one or more pharmaceutically acceptable carriers or adjuvants. They may be administered orally or parenterally and, depending upon the compound employed and the mode of administration, the exact dosage utilized may vary.

Furthermore, the compounds of Formula I may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzene-sulfonate and the like.

In general, satisfactory results are obtained when these compounds are administered at a daily dosage of about .003 milligrams to about 5 milligrams per kilogram of animal body weight. This daily dosage is preferably administered 2 to 4 times a day, or in sustained release form. For most large mammals, the total daily dosage is from about 0.03 milligram to about 20 milligrams. Dosage forms suitable for internal use comprise from about .01 milligram to about 10 milligrams of the active compound in intimate admixture with a solid or liquid pharmaceutically acceptable carrier or diluent.

A representative formulation suitable for oral administration is a tablet prepared by standard tabletting techniques which contains the following.

| Ingredient: | Parts by weight |
|---|---|
| 2-(2,6-dichlorophenyl) - 5,6 - dihydroimidazo[2,1-b]thiazole hydrobromide | 5 |
| Tragacanth | 2 |
| Lactose | 84.5 |
| Corn starch | 5 |
| Talcum | 3 |
| Magnesium stearate | 0.5 |

The following examples are provided for the purpose of illustration and not by way of limitation. They are not intended so as to limit the scope of the invention as defined in the appended claims.

EXAMPLE 1

2-(2,6-dichlorophenyl)-3-hydroxy-2,3,5,6-tetrahydroimidazo[2,1-b]thiazole hydrobromide

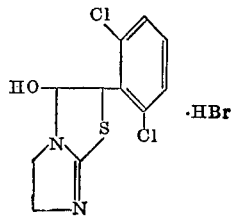

A solution of bromine (17 ml.) in methylene chloride (50 ml.) is added with stirring to a solution of 2,6-dichlorophenylacetaldehyde (58.0 g.) in methylene chloride (75 ml.) maintained at −20° C. over a period of 20 minutes. The resultant mixture is stirred at −20° for 3½ hours, allowed to warm to room temperature and then refluxed for ½ hour. The reaction mixture is evaporated in vacuo and the residue dissolved in methylene chloride, (100 ml.), washed successively with water (100 ml.), 10% sodium bicarbonate solution (50 ml.) and dried over sodium sulfate. Evaporation in vacuo provides α-bromo-2,6-dichlorophenylacetaldehyde as a semi-solid.

α-Bromo - 2,6 - dichlorophenylacetaldehyde (13.4 g.) is added to a stirred suspension of ethylenethiourea (5.1 g.) in acetone (250 ml.). The reaction mixture is stirred at room temperature for 48 hours, and the resultant solid is collected by filtration to give 2-(2,6-dichlorophenyl)-3-hydroxy-2,3,5,6-tetrahydroimidazo[2,1 - b]thiazole hydrobromide; M.P. 263°–265° C. with decomposition.

EXAMPLE 2

2-(2,6-dichlorophenyl)-5,6-dihydroimidazo[2,1-b]thiazole hydrobromide

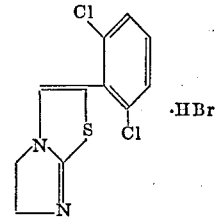

A mixture of 2-(2,6-dichlorophenyl)-3-hydroxy-2,3,5,6-tetrahydroimidazo[2,1-b]thiazole hydrobromide (11.5 g.) and glacial acetic acid (200 ml.) is heated under reflux for 18 hours. The mixture is evaporated in vacuo and the residue crystallized from methanol-ether (1:1) to give 2-(2,6 - dichlorophenyl)-5,6-dihydroimidazo[2,1-b]thiazole hydrobromide; M.P. 270°–272° C.

EXAMPLE 3

5-(2,6-dichlorophenyl)-4-hydroxy-3-methyl-2-methyliminothiazolidine hydrobromide

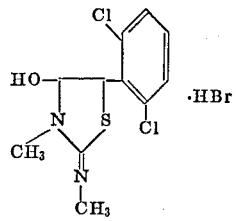

α-Bromo - 2,6 - dichlorophenylacetaldehyde (8.0 g.) is added to a stirred suspension of N,N'-dimethylthiourea (3.1 g.) in acetone (150 ml.) The reaction mixture is stirred at room temperature for 6 days, and the resultant solid is collected by filtration to give 5-(2,6-dichlorophenyl) - 4 - hydroxy-3-methyl-2-methyliminothiazolidine hydrobromide; M.P. 172°–174° C. with decomposition.

EXAMPLE 4

5-(2,6-dichlorophenyl)-3-methyl-2-methylimino-4-thiazoline hydrobromide

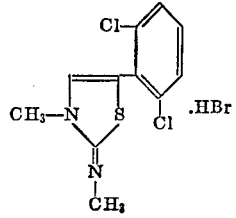

A mixture of 5 - (2,6 - dichlorophenyl) - 4 - hydroxy-3 - methyl - 2 - methyliminothiazolidine hydrobromide (4.0 g.) and glacial acetic acid (75 ml.) is heated under reflux for 1 hour. The mixture is evaporated in vacuo and the residue crystallized from methanol-ether (1:1) to give 5 - (2,6 - dichlorophenyl) - 3 - methyl - 2 - methylimino-4-thiazoline hydrobromide; M.P. 220°–222° C.

EXAMPLE 5

2-(2,6-dichlorophenyl)-3-hydroxy-2,3,6,7-tetrahydro-5H-thiazolo[3,2-a]pyrimidine hydrobromide

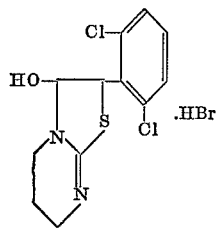

α-Bromo-2,6-dichlorophenylacetaldehyde (7.5 g.) is added to a stirred suspension of propylenethiourea (3.5 g.) in acetone (250 ml.). The reaction mixture is stirred at room temperature for 24 hours, and the resultant solid is collected by filtration to give 2-(2,6-dichlorophenyl)-3-hydroxy - 2,3,6,7 - tetrahydro - 5H - thiazolo[3,2-a]pyrimidine hydrobromide; M.P. 262°–263° C. with decomposition.

EXAMPLE 6

2-(2,6-dichlorophenyl)-6,7-dihydro-5H-thiazolo[3,2-a]pyrimidine hydrobromide

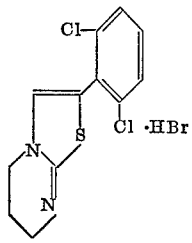

A mixture of 2 - (2,6 - dichlorophenyl) - 3 - hydroxy-2,3,6,7 - tetrahydro - 5H - thiazolo[3,2-a]pyrimidine hydrobromide (6.8 g.) and glacial acetic acid (200 ml.) is heated under reflux for 18 hours. The mixture is evaporated in vacuo and the residue crystallized from methanol-ether (1:1) to give 2 - (2,6 - dichlorophenyl) - 6,7 - dihydro-5H-thiazolo[3,2-a]pyrimidine hydrobromide; M.P. 277°–279° C.

EXAMPLE 7

2-(2,6-dimethylphenyl)-3-hydroxy-2,3-5,6-tetrahydro-imidazo[2,1-b]thiazole hydrobromide

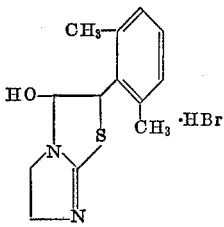

A mixture of 2,6-dimethylphenylacetaldehyde (1.50 g.) and pyridinium hydrobromide perbromide (3.2 g.) in 15 ml. of methylene chloride is stirred at −20° C. After 15 minutes, glacial acetic acid (6.0 ml.) is added. Stirring is continued for 4 hours, allowing the mixture to warm to room temperature. Water (20 ml.) is then added. The methylene chloride layer is washed successively with 2 N sodium bicarbonate solution (20 ml.), water (10 ml.) and dried over sodium sulfate. Evaporation provides an α-bromo-2,6-dimethylphenylacetaldehyde as an oil.

α-Bromo-2,6-dimethylphenylacetaldehyde (2.1 g. is added to a stirred suspension of ethylenethiourea (0.95 g.) in acetone (25 ml.). The reaction mixture is stirred at room temperature for 18 hours, and the resultant solid is collected by filtration to give 2-(2,6-dimethylphenyl)-3-hydroxy - 2,3,5,6 - tetrahydroimidazo[2,1-b]thiazole hydrobromide; M.P. 278–280° C., with decomposition.

EXAMPLE 8

2-(2,6-dimethylphenyl)-5,6-dihydroimidazo[2,1-b]thiazole hydrobromide

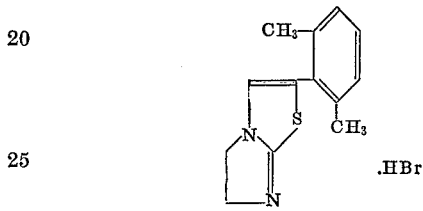

A mixture of 2 - (2,6 - dimethylphenyl) - 3 - hydroxy-2,3,5,6 - tetrahydroimidazo[2,1-b]thiazole hydrobromide (1.4 g.) and glacial acetic acid (25 ml.) is heated under reflux for 3 hours. The mixture is evaporated in vacuo and the residue crystallized from ethanol-ether (1:3) to give 2 - (2,6 - dimethylphenyl) - 5,6 - dihydroimidazo[2,1-b]thiazole hydrobromide; M.P. 273–274° C.

EXAMPLE 9

2-(2-chloro-6-trifluoromethylphenyl)-3-hydroxy-2,3,5,6-tetrahydroimidazo[2,1-b]thiazole hydrobromide

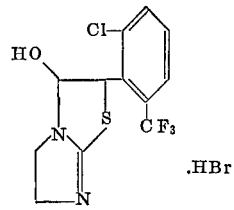

A solution of bromine (17 ml.) in methylene chloride (50 ml.) is added with stirring to a solution of 2-chloro-6-trifluoromethylphenylacetaldehyde (71.0 g.) in methylene chloride (75 ml.) maintained at −20° C. over a period of 20 minutes. The resultant mixture is stirred at −20° C. for 3½ hours, allowed to warm to room temperature and then refluxed for ½ hour. The reaction mixture is evaporated in vacuo and the residue dissolved in methylene chloride (100 ml.), washed successively with water (100 ml.), 10% sodium bicarbonate solution (50 ml.) and dried over sodium sulfate. Evaporation in vacuo provides α - bromo - 2 - chloro - 6 - trifluoromethylphenylacetaldehyde as a semi-solid.

α - Bromo - 2 - chloro - 6 - trifluoromethylphenylacetaldehyde (15.3 g.) is added to a stirred suspension of ethylenethiourea (5.1 g.) in acetone (250 ml.). The reaction mixture is stirred at room temperature for 48 hours, and the resultant solid is collected by filtration to give 2 - (2 - chloro - 6 - trifluoromethylphenyl) - 3 - hydroxy - 2,3,5,6 - tetrahydroimidazo[2,1-b]thiazole hydrobromide, M.P. 295°–297° C., dec.

EXAMPLE 10

2-(2-chloro-6-trifluoromethylphenyl)-5,6-dihydro-
imidazo[2,1-b]thiazole hydrobromide

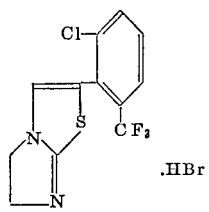

A mixture of 2-(2-chloro-6-trifluoromethylphenyl)-3-hydroxy-2,3,5,6-tetrahydroimidazo[2,1-b]thiazole hydrobromide (11.5 g.) and glacial acetic acid (200 ml.) is heated under reflux for 18 hours. The mixture is evaporated in vacuo and the residue crystallized from methanol-ether (1:1) to give 2-(2-chloro-6-trifluoromethylphenyl) - 5,6 - dihydroimidazo[2,1-b]thiazole hydrobromide, M.P. 291–293° C. dec.

EXAMPLE 11

2-(2,6-difluorophenyl)-3-hydroxy-2,3,5,6-tetrahydro-
imidazo[2,1-b]thiazole hydrobromide

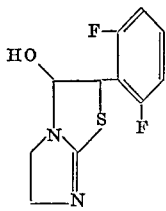

A solution of bromine (17 ml.) in methylene chloride (50 ml.) is added with stirring to a solution of 2,6-difluorophenylacetaldehyde (48.0 g.) in methylene chloride (75 ml.) maintained at −20° C. over a period of 20 minutes. The resultant mixture is stirred at −20° C. for 3½ hours, allowed to warm to room temperature and then refluxed for ½ hour. The reaction mixture is evaporated in vacuo and the residue dissolved in methylene chloride, (100 ml.), washed successively with water (100 ml.), 10% sodium bicarbonate solution (50 ml.) and dried over sodium sulfate. Evaporation in vacuo provides α-bromo-2,6-difluorophenylacetaldehyde as a semisolid.

α-Bromo-2,6-difluorophenylacetaldehyde (11.2 g.) is added to a stirred suspension of ethylenethiourea (5.1 g.) in acetone (250 ml.). The reaction mixture is stirred at room temperature for 48 hours, and the resultant solid is collected by filtration to give 2-(2,6-difluorophenyl)-3-hydroxy-2,3,5,6-tetrahydroimidazo[2,1-b]thiazole hydrobromide.

EXAMPLE 12

2-(2,6-difluorophenyl)-5,6-dihydroimidazo[2,1-b]
thiazole hydrobromide

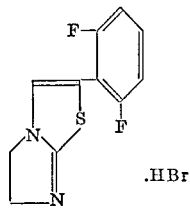

A mixture of 2-2,6-difluorophenyl)-3-hydroxy-2,3,5,6-tetrahydroimidazo[2,1-b]thiazole hydrobromide (11.5 g.) and glacial acetic acid 200 ml.) is heated under reflux for 18 hours. The mixture is evaporated in vacuo and the residue crystallized from methanol-ether (1:1) to give 2 - (2,6 - difluorophenyl)-5,6-dihydroimidazo[2,1-b]thiazole hydrobromide.

EXAMPLE 13

5-(2,6-dimethylphenyl)-4-hydroxy-3-methyl-2-
methyliminothiazolidine hydrobromide

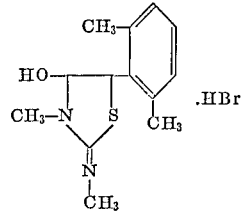

α-Bromo-2,6-dimethylphenylacetaldehyde (6.8 g.) is added to a stirred suspension of N,N'-dimethylthiourea (3.1 g.) in acetone (150 ml.). The reaction mixture is stirred at room temperature for 6 days, and the resultant solid is collected by filtration to give 5-(2,6-dimethylphenyl) - 4 - hydroxy-3-methyl-2-methyliminothiazolidine hydrobromide.

EXAMPLE 14

5-(2,6-dimethylphenyl)-3-methyl-2-methylimino-
4-thiazoline hydrobromide

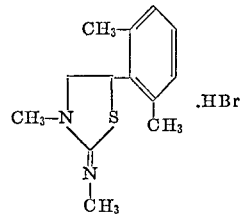

A mixture of 5-(2,6-dimethylphenyl)-4-hydroxy-3-methyl-2-methyliminothiazolidine hydrobromide (4.0 g.) and glacial acetic acid (75 ml.) is heated under reflux for 1 hour. The mixture is evaporated in vacuo and the residue crystallized from methanol-ether (1:1) to give 5-(2,6 - dimethylphenyl)-3-methyl-2-methylimino-4-thiazoline hydrobromide.

EXAMPLE 15

2-(2,6-dimethylphenyl)-3-hydroxy-2,3,6,7-tetrahydro-
5H-thiazole[3,2-a]pyrimidine hydrobromide

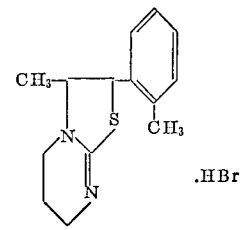

α-Bromo-2,6-dimethylphenylacetaldehyde (6.4 g.) is added to a stirred suspension of propylenethiourea (3.5 g.) in acetone (250 ml.). The reaction mixture is stirred at room temperature for 24 hours, and the resultant solid is collected by filtration to give 2-(2,6-dimethylphenyl)-3 - hydroxy-2,3,6,7-tetrahydro-5H-thiazolo[3,2-a]pyrimidine hydrobromide.

EXAMPLE 16

2-(2,6-dimethylphenyl)-6,7-dihydro-5H-thiazolo-
[3,2-a]pyrimidine hydrobromide

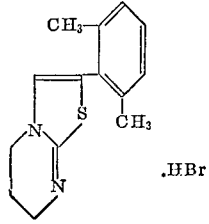

A mixture of 2-(2,6-dimethylphenyl)-3-hydroxy-2,3,6,7-tetrahydro-5H-thiazolo[3,2-a]pyrimidine hydrobromide (6.8 g.) and glacial acetic acid (200 ml.) is heated under reflux for 18 hours. The mixture is evaporated in vacuo and the residue crystallized from methanol-ether (1:1) to give 2-(2,6-dimethylphenyl)-6,7-dihydro-5H-thiazolo-[3,2-a]pyrimidine hydrobromide.

EXAMPLE 17

2-(2,6-diethylphenyl)-3-hydroxy-2,3,5,6-tetrahydroimidazo[2,1-b]thiazole

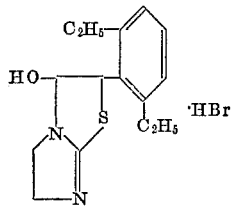

A mixture of 2,6-diethylphenylacetaldehyde and pyridinium hydrobromide perbromide in methylene chloride is stirred at −20° C. After 15 minutes, glacial acetic acid is added. Stirring is continued for 4 hours, allowing the mixture to warm to room temperature. Water is then added. The methylene chloride layer is washed successively with 2 N sodium bicarbonate solution, water and dried over sodium sulfate. Evaporation provides an α-bromo-2,6-diethylphenylacetaldehyde.

α-Bromo-2,6-diethylphenylacetaldehyde is added to a stirred suspension of ethylenethiourea in acetone. The reaction mixture is stirred at room temperature for 18 hours, and the resultant solid is collected by filtration to give 2-(2,6-diethylphenyl)-3-hydroxy-2,3,5,6-tetrahydroimidazo[2,1-b]thiazole hydrobromide.

EXAMPLE 18

2-(2,6-diethylphenyl)-5,6-dihydroimidazo[2,1-b]thiazole hydrobromide

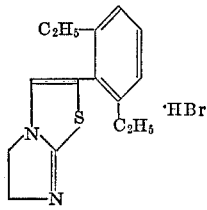

A mixture of 2-(2,6-diethylphenyl)-3-hydroxy-2,3,5,6-tetrahydroimidazo[2,1-b]thiazole hydrobromide and glacial acetic acid is heated under reflux for 3 hours. The mixture is evaporated in vacuo and the residue crystallized from ethanol-ether (1:3) to give 2-(2,6-diethylphenyl)-5,6-dihydroimidazo[2,1-b]thiazole hydrobromide.

What is claimed is:
1. A compound of the formula:

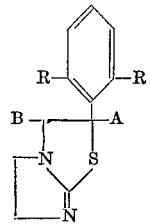

wherein
each R independently, represents chloro or fluoro, trifluoromethyl, or lower alkyl having 1 to 3 carbon atoms,
A represents H, and
B represents —OH, or
A and B together represent a carbon to carbon bond;
or a pharmaceutically acceptable acid addition salt thereof.

2. The compound of claim 1 which is 2-(2,6-dichlorophenyl)-3-hydroxy - 2,3,5,6 - tetrahydroimidazo[2,1-b]thiazole.

3. The compound of claim 1 which is 2-(2,6-dichlorophenyl)-5,6-dihydroimidazo[2,1-b]thiazole.

4. The compound of claim 1 which is 2-(2,6-dimethylphenyl) - 3 - hydroxy-2,3,5,6-tetrahydroimidazo-[2,1-b]thiazole.

5. The compound of claim 1 which is 2-(2,6-dimethylphenyl)-5,6-dihydroimidazo[2,1-b]thiazole.

6. The compound of claim 1 which is 2-(2-chloro-6-trifluoromethylphenyl) - 3-hydroxy - 2,3,5,6 - tetrahydroimidazo[2,1-b]thiazole.

7. The compound of claim 1 which is 2-(2-chloro-6 - trifluoromethylphenyl) - 5,6 - dihydroimidazo[2,1-b]thiazole.

8. The compound of claim 1 which is 2-(2,6-difluorophenyl)-3-hydroxy - 2,3,5,6 - tetrahydroimidazo[2,1-b]thiazole.

9. The compound of claim 1 which is 2-(2,6-difluorophenyl)-5,6-dihydroimidazo[2,1-b]thiazole.

10. The compound of claim 1 which is 2-(2,6-diethylphenyl) - 3 - hydroxy - 2,3,5,6-tetrahydroimidazo[2,1-b]thiazole.

11. The compound of claim 1 which is 2-(2,6-diethylphenyl)-5,6-dihydroimidazo[2,1-b]thiazole.

References Cited
UNITED STATES PATENTS
3,551,426   12/1970   Manning _____ 260—306.7

ALEX MAZEL, Primary Examiner
R. J. GALLAGHER, Assistant Examiner

U.S. Cl. X.R.
260—251 A, 564 R; 421—200, 270